(12) United States Patent
Frost

(10) Patent No.: US 12,385,467 B2
(45) Date of Patent: Aug. 12, 2025

(54) SPHERICAL WIND TURBINE WITH DIMPLES

(71) Applicant: Mercade Caimon Frost, Los Angeles, CA (US)

(72) Inventor: Mercade Caimon Frost, Los Angeles, CA (US)

(*) Notice: Subject to any disclaimer, the term of this patent is extended or adjusted under 35 U.S.C. 154(b) by 0 days.

(21) Appl. No.: 18/627,726

(22) Filed: Apr. 5, 2024

(65) Prior Publication Data

US 2024/0337242 A1 Oct. 10, 2024

Related U.S. Application Data

(60) Provisional application No. 63/495,190, filed on Apr. 10, 2023.

(51) Int. Cl.

| | |
|---|---|
| *F03D 5/00* | (2006.01) |
| *F03D 9/00* | (2016.01) |
| *F03D 9/25* | (2016.01) |
| *H02K 7/18* | (2006.01) |
| *H02S 10/12* | (2014.01) |
| *H02S 10/20* | (2014.01) |

(52) U.S. Cl.
CPC ............... *F03D 5/00* (2013.01); *F03D 9/007* (2013.01); *F03D 9/25* (2016.05); *H02K 7/183* (2013.01); *H02S 10/12* (2014.12); *H02S 10/20* (2014.12); *F05B 2250/241* (2013.01)

(58) Field of Classification Search
CPC ... F03D 5/00; F03D 9/007; F03D 9/25; F03D 9/11; F03D 13/20; H02K 7/183; H02S 10/12; H02S 10/20; F05B 2250/241
See application file for complete search history.

(56) References Cited

FOREIGN PATENT DOCUMENTS

| | | | |
|---|---|---|---|
| CN | 118273881 A | * 7/2024 | |
| WO | WO-2018208169 A1 | * 11/2018 | ............... F03D 1/04 |

* cited by examiner

*Primary Examiner* — Joseph Ortega
(74) *Attorney, Agent, or Firm* — Knobbe. Martens, Olson & Bear, LLP

(57) ABSTRACT

Disclosed systems and devices relate to generating energy using spherical wind turbines with dimples. The systems, devices, and methods described herein relate to a wind turbine with no blades or propellers. Currently, wind turbines with blades or propellers can have their functionality impaired by the presence of dust, soot, or ash particles in the air. This makes it difficult to operate current wind turbines in certain harsh environments. In this device, a spherical shell entirely encapsulates the generator, such that dust, soot, or ash particles do not interfere with the turbine. In some embodiments, the dimples capture wind to rotate the spherical shell. In some embodiments, the outer surface of the spherical shell is covered with flexible solar cells. In some embodiments, the flexible solar cells sit inside the dimples.

10 Claims, 7 Drawing Sheets

SPHERICAL WIND TURBINE WITH DIMPLES

CROSS-REFERENCE TO RELATED APPLICATION

This application claims the benefit of U.S. Provisional Patent Application No. 63/495,190, filed Apr. 10, 2023, and titled "SPHERICAL WIND TURBINE WITH DIMPLES", which is incorporated herein by reference in its entirety.

BACKGROUND

The present application relates to spherical wind turbines with dimples for energy generation. The spherical wind turbines can have shells and cages containing generators. The spherical wind turbines can have generators configured to generate electricity when the cage rotates. The spherical wind turbines can have flexible solar panels on the dimples for additional energy generation. The generators can charge batteries. The batteries can be replaced via rails. The spherical wind turbines can be tilted by pivots for better wind capture. The spherical wind turbines can be raised up and down on towers.

SUMMARY

Various embodiments described herein relate to systems and devices for generating energy using spherical wind turbines with dimples. In particular, in some embodiments, the systems, devices, and methods described herein relate to a wind turbine with no blades or propellers. Currently, wind turbines with blades or propellers can have their functionality impaired by the presence of dust, soot, or ash particles in the air. This makes it difficult to operate current wind turbines in certain harsh environments. One example of a harsh environment where energy generation could be valuable is the surface of Mars. In some embodiments, a spherical shell can entirely encapsulate the generator, such that dust, soot, or ash particles do not interfere with the turbine. In some embodiments, the shell can be a portion of a sphere. In some embodiments, the wind turbine can have at least one dimple. In some embodiments, the dimples can capture wind to rotate the spherical shell. In some embodiments, the dimples can reduce drag and increase lift. In some embodiments, the dimples can be shaped and spaced to optimize wind capture. In some embodiments, a pivot at the bottom of the turbine can be configured to tilt the turbine to an angle at which the dimples can efficiently capture the wind. In some embodiments, the pivot at the bottom of the turbine can be connected to a tower that supports the spherical shell. In some embodiments, a cage inside the spherical shell can be connected to the spherical shell by beams. In some embodiments, the cage can rotate when the spherical shell rotates.

In some embodiments, a generator inside the cage can generate electrical energy when the cage rotates. In some embodiments, the outer surface of the spherical shell can be covered with flexible solar cells or solar panels. The solar cells or solar panels can convert sunlight into electricity. In some embodiments, the flexible solar cells can sit inside the dimples. In some embodiments, the flexible solar cells can be connected to a battery inside the cage via wires that go through holes in the cage. In some embodiments, the tower can have rails that transport batteries up and down the tower to replace the battery in the cage when beneficial. In some embodiments, the combination of wind energy and solar energy can allow the turbine to compound the amount of energy generated per size of the generator. Advantageously, in some embodiments, this can allow the turbine to be constructed to be smaller and more portable, yet still able to generate large amounts of energy. In some embodiments, there is no tower, and the spherical wind turbine can be mounted, or suspended on wires.

In some embodiments, the systems, methods, and devices herein can relate to an apparatus for creating electrical energy from wind, the apparatus comprising a spherical turbine with at least one dimple, a cage inside the spherical turbine, wherein the cage is connected to the spherical turbine with at least one beam, a generator mounted inside the cage, wherein the generator is configured to generate energy when the cage rotates, a pivot attached to a bottom of the spherical turbine, and a tower attached to the bottom of the pivot, wherein the tower is configured to support the spherical turbine.

In some embodiments, the systems, methods, and devices herein can relate to a method for harvesting energy from wind flow, the method comprising providing a turbine comprising a spherical shell comprising at least one dimple, and a tower configured to support the spherical shell, determining an optimal position of the spherical shell for capturing wind, and pivoting the spherical shell to the optimal position for capturing wind. In some embodiments, the systems, methods, and devices herein can further comprise a method wherein pivoting the spherical shell comprises tilting the tower. In some embodiments, the systems, methods, and devices herein can further comprise a method wherein pivoting the spherical shell comprises tilting a pivot between the tower and the spherical shell. In some embodiments, the systems, methods, and devices herein can further comprise a method wherein pivoting the spherical shell comprises automatically pivoting the spherical shell.

In some embodiments, the systems, methods, and devices herein can further comprise at least one solar cell overlayed on an exterior of the spherical turbine, at least one hole in the cage, a battery inside the cage, and at least one wire connecting the at least one solar cell to the battery through the at least one hole in the cage. In some embodiments, the at least one solar cell can be overlayed on the at least one dimple. In some embodiments, the systems, methods, and devices herein can further comprise a rail on the tower, wherein the rail is configured to move the battery up and down the tower. In some embodiments, the cage can be a cone. In some embodiments, the cage can be a cylinder. In some embodiments, the systems, methods, and devices herein can further comprise an O-Ring attached to the cage. In some embodiments, the systems, methods, and devices herein can further comprise a hydraulic beam. In some embodiments, the systems, methods, and devices herein can further comprise at least one smart switch configured to turn the at least one solar cell on and off. In some embodiments, the systems, methods, and devices herein can further comprise at least one lip on the at least one dimple. In some embodiments, the pivot can be configured to tilt the spherical turbine to an angle in which the at least one dimple can optimally capture wind. In some embodiments, the systems, methods, and devices herein can further comprise a converter connected to the generator, wherein the converter can be configured to convert voltage from alternating current to direct current.

In some embodiments, the spherical wind turbine apparatus can include a data storage device storing instructions for configuration of the spherical wind turbine apparatus and a processor configured to execute the instructions to perform various operations for configuration of the spherical wind turbine apparatus. In some embodiments, the spherical wind turbine apparatus can include a wireless receiver device for receiving instructions for configuration of components of the spherical wind turbine apparatus, and a processor configured to execute the instructions to perform various operations for configuration of the spherical wind turbine apparatus.

BRIEF DESCRIPTION OF THE DRAWINGS

In the drawings, which are not necessarily to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
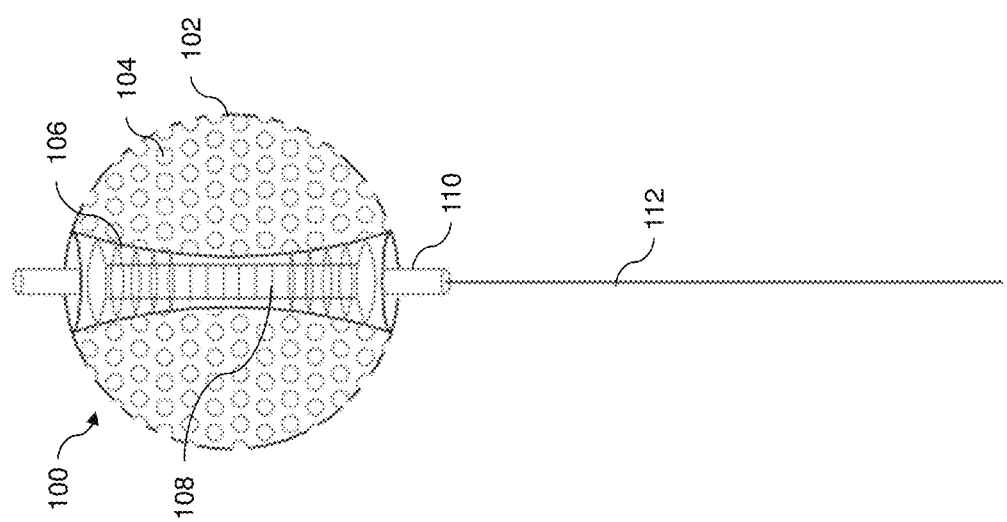
FIG. 1 illustrates an embodiment of the spherical wind turbine apparatus.

A better understanding of different embodiments of the systems, devices, and methods described herein may be had from the following description, read in conjunction with the accompanying drawings, in which like reference characters refer to like elements.

Embodiments of a spherical wind turbine with dimples are disclosed herein. Although certain illustrative embodiments are shown in the drawings and will be described below in detail, the application is not limited to these embodiments. There is no intention to limit the disclosure to the specific embodiments disclosed. On the contrary, the disclosure is intended to cover all modifications, alternative constructions, combinations, and equivalents falling within the spirit and scope of the disclosure.

In some embodiments, the systems and devices described herein are related to generating energy using spherical wind turbines with dimples.

FIG. 1 illustrates an embodiment of the spherical wind turbine apparatus 100. In some embodiments, a spherical shell 102 can encapsulate the internal components of the spherical wind turbine apparatus 100. In some embodiments, the spherical shell 102 can have one or more dimples 104. In some embodiments, a cage 106 inside the spherical shell 102 can be connected to the spherical shell 102 via beams. In some embodiments, a generator 108 can sit inside the cage 106. In some embodiments, a pivot 110 can sit beneath the spherical shell 102. In some embodiments, a tower 112 can be attached to the bottom of the pivot 110.

In some embodiments, the spherical shell 102 can be completely closed. In some embodiments, the spherical shell 102 can be a portion of a sphere. In some embodiments, the spherical shell 102 can be made of a light-weight metal. In some embodiments, the spherical shell 102 can be made of aluminum. In some embodiments, the spherical shell 102 can be made of titanium. In some embodiments, the spherical shell 102 can be made of magnesium alloys. In some embodiments, the spherical shell can be made from steel. In some embodiments, the spherical shell 102 can be covered, at least partially, with at least one solar cell. In some embodiments, the solar cells can be flexible. In some embodiments, wires can connect the flexible solar cells on the spherical shell 102 to a battery inside the cage 106. In some embodiments, smart inverters can be integrated with the flexible solar cells. In some embodiments, the spherical shell 102 can be coupled with at least one mirror wherein the mirror is configured to reflect light for optimal light saturation by the solar cells. In some embodiments, the movement of the spherical shell 102 can be at least partially halted by a caliper braking system. In some embodiments, the spherical shell 102 can be raised or lowered from the ground to reduce issues with dust, soot, or ash particles.

In some embodiments, the dimples 104 can be indentations. In some embodiments, the dimples 104 can be grooves. In some embodiments, the dimples 104 can be notches. In some embodiments, the dimples 104 can be dents. In some embodiments, the dimples 104 can be round. In some embodiments the dimples 104 can be hexagonal. Advantageously, in some embodiments, the dimples 104 can allow lower knots of wind to spin the spherical shell 102 for longer. In some embodiments, the dimples 104 can be covered, at least partially, with flexible solar cells. In some embodiments, the size, spacing, and placement of dimples can be adjusted to more efficiently capture wind depending on the intended environment of the apparatus. In some embodiments, the size, spacing, and placement of the solar cells can be adjusted to more efficiently capture energy from light depending on the intended environment of the apparatus. In some embodiments, wires can connect the flexible solar cells on the dimples 104 to a battery inside the cage 106. In some embodiments, smart inverters can be integrated with the flexible solar cells. In some embodiments, a smart switch can turn the solar cells on and off.

In some embodiments, the cage 106 can be a cylinder. In some embodiments, the cage 106 can be a cone. In some embodiments, the cage 106 can be a rectangular prism. In some embodiments, the cage 106 can be hollow. In some embodiments, the cage 106 can sit above an O-ring 304. In some embodiments, the O-ring 304 can spin when the spherical shell 102 spins. In some embodiments, the cage 106 can sit above a hydraulic O-ring 304. In some embodiments, kinetic energy from the rotation of the O-ring can be stored in batteries. In some embodiments, kinetic energy from the rotation of the O-ring can be transferred through wires to the batteries. In some embodiments, the cage 106 can have holes so that wires can reach the batteries. In some embodiments, kinetic energy from the rotation of the O-ring can be transferred through copper wires to the batteries. In some embodiments, at least one battery can sit inside the cage 106 to store energy from flexible solar cells. In some embodiments, at least one battery can be stored outside the spherical wind turbine apparatus 100. In some embodiments, multiple batteries can sit inside the cage 106 to store energy from flexible solar cells. In some embodiments, the cage 106 can be coupled with at least one mirror wherein the mirror is configured to reflect light for optimal light saturation by the solar cells. In some embodiments, the cage 106 can conduct energy at its core via copper wire conductors. In some embodiments, the cage 106 can contain cavities. In some embodiments, the cage 106 can be suspended by wires. In some embodiments, the cage 106 can be coupled to pulleys or winches. In some embodiments, the cage 106 can use pulleys or winches to control its position. In some embodiments, the cage 106 can automatically change its position by operating pulleys or winches.

In some embodiments, the generator 108 can be configured to generate electricity when the cage 106 rotates. In some embodiments, the generator can stay stationary when the spherical shell 102 spins. In some embodiments, the generator 108 can spin when the spherical shell 102 spins. In some embodiments, the generator 108 can comprise a rotor and a stator. In some embodiments, the generator 108 can be driven by a gearbox. In some embodiments, the generator 108 can further comprise a liquid cooling system. In some embodiments, the generator 108 can comprise a synchronous generator. In some embodiments, the generator 108 can comprise an asynchronous generator. In some embodiments, the generator 108 can sit above the battery. In some embodiments, the generator 108 can sit below the battery. In some embodiments, the generator 108 can be a hydraulic generator. In some embodiments, a converter can convert the voltage of the generator 108 from alternating current to direct current. In some embodiments, the energy from the generator 108 can be transferred wirelessly. In some embodiments, energy can be transmitted using electromagnetic power transfer. In some embodiments, energy can be transmitted using capacitive coupling. In some embodiments, energy can be transmitted using inductive coupling. In some embodiments, energy can be transmitted using power beaming. In some embodiments, energy can be transmitted by using a light wave focused at a receiver external to spherical wind turbine apparatus 100. In some embodiments, energy can be transmitted using phased arrays. In some embodiments, energy can be transmitted through liquids.

In some embodiments, the pivot 110 can be configured to angle the spherical shell 102 such that the dimples 104 can capture the wind. In some embodiments, the pivot 110 can be programmed to automatically pivot depending on wind patterns. In some embodiments, the pivot 110 can be manually controlled and positioned. In some embodiments, the pivot 110 can be made of rubber. In some embodiments, the pivot 110 can be made of light weight metal.

In some embodiments, the tower 112 can support the spherical shell 102. In other embodiments, the spherical shell 102 can be supported by a wire, gimbals, or another support mechanism. In some embodiments, the tower 112 can sway with the wind. In some embodiments, the tower 112 can be configured to tilt the spherical shell 102 such that the dimples 104 capture the wind. In some embodiments, the tower 112 can be programmed to automatically pivot depending on wind patterns. In some embodiments, the tower 112 can be manually controlled and positioned. For example, the tower 112 can have sensors to detect the direction and/or speed of the wind. The tower 112 can pivot based on wind pattern information received from a database. In some embodiments, the tower 112 can be coupled with at least one mirror wherein the mirror is configured to reflect light for optimal light saturation by the solar cells. In some embodiments, the tower 112 can be made of light weight metal. In some embodiments, the tower 112 can be made of steel. In some embodiments, the tower 112 can be made of resin. In some embodiments, the tower 112 can be made of plastic. In some embodiments, the tower 112 can be made of water-resistant and corrosion-resistant materials such that the tower 112 can be submerged in bodies of water for long durations of time. In some embodiments, the tower can provide storage and/or shelter resistant to the outside environment. For example, the tower 112 can provide a habitat for aquatic life. In some embodiments, the tower 112 can be connected to a support center. In some embodiments, the support center can be configured to repair the tower 112 via people or drones. In some embodiments, the support center can be configured to replace batteries via the rails 302 on the tower 112. In some embodiments, the tower 112 can lean. In some embodiments, the tower 112 cannot lean. In some embodiments, the batteries can move on a track. In some embodiments, the batteries can move on a pulley. In some embodiments, spherical wind turbine apparatus 100 can have no tower. In some embodiments, the spherical wind turbine apparatus 100 can be suspended by wires. In some embodiments, the spherical wind turbine apparatus 100 can be mounted on a gimbal. In some embodiments, the spherical wind turbine apparatus 100 can use pulleys or winches to control its position. In some embodiments, the cage 106 can automatically change its position by operating pulleys or winches.

In some embodiments, spherical wind turbine apparatus 100 can include a data storage device storing instructions for configuration of the spherical wind turbine apparatus 100. In some embodiments, spherical wind turbine apparatus 100 can include a processor configured to execute instructions. In some embodiments, the processor can receive instructions from the data storage device and execute the instructions. In some embodiments, spherical wind turbine apparatus 100 can include a wireless receiver device for receiving instructions for configuration of components of the spherical wind turbine apparatus 100. In some embodiments, the processor can receive instructions from the wireless receiver device and execute the instructions. In some embodiments, the data storage device can receive instructions from the wireless receiver device. In some embodiments, the data storage device can receive updates about weather patterns from the wireless receiver device. In some embodiments, the data storage device can receive updates to instructions from the wireless receiver device.

In some embodiments, the processor can execute instructions to turn the solar cells on or off. In some embodiments, the processor can execute instructions to instruct the converter to convert the voltage of the generator 108 from alternating to direct current. In some embodiments, the processor can execute instructions to instruct the converter to convert the voltage of the generator 108 from direct to alternating current. In some embodiments, the processor can execute instructions to control the pivot 110 to angle the spherical shell 102 such that the dimples 104 can capture the wind. In some embodiments, the processor can execute instructions to pivot the tower 112 in response to wind patterns. In some embodiments, the processor can execute instructions to move batteries via the rails 302 on the tower 112. In some embodiments, the processor can execute instructions to raise or lower the spherical wind turbine apparatus 100 via tower 112 in response to wind patterns. In some embodiments, the processor can execute instructions to change the position of the spherical wind turbine apparatus 100 via pulleys, winches, or gimbals in response to wind patterns. In some embodiments, the wireless receiver device can transmit information regarding the status of batteries. In some embodiments, the processor can instruct the rails 302 to transfer batteries up or down the tower 112.

In some embodiments, the spherical shell 102 can have sensors for sensing atmospheric conditions. In some embodiments, the dimples 104 can have sensors for sensing atmospheric conditions. In some embodiments, the tower 112 can have sensors for sensing atmospheric conditions. In some embodiments, the sensors on the spherical shell 102, the dimples 104, or the tower 112 can detect optimal atmospheric conditions for capturing wind. In some embodiments, the sensors on the spherical shell 102, the dimples 104, or the tower 112 can detect an optimal position of the spherical shell 102 for capturing wind. In some embodiments, the sensors on the spherical shell 102, the dimples 104, or the tower 112 can be relayed to a processor. In some embodiments, the sensors on the spherical shell 102, the dimples 104, or the tower 112 can be relayed to a data storage device. In some embodiments, the sensors on the spherical shell 102, the dimples 104, or the tower 112 can be relayed to a wireless transmitter. In some embodiments, information can be processed from the sensors on the spherical shell 102, the dimples 104, or the tower 112 and an optimal position of the spherical shell 102 can be calculated.

In some embodiments, a processor can be configured to position the spherical shell 102 in the desired optimal position for capturing wind. In some embodiments, the processor can receive instructions based on information regarding atmospheric conditions from a database. In some embodiments, the processor can receive instructions via remote control. In some embodiments, the processor can receive instructions via a computer automated system. In some embodiments, the optimal position of the spherical shell 102 can be determined by a computer automated system. In some embodiments, information from sensors on the spherical shell 102, the dimples 104, or the tower 112 can be used by a computer automated system to determine the optimal height of the tower 112 for optimal wind capture. In some embodiments, information from sensors on the spherical shell 102, the dimples 104, or the tower 112 can be used by a computer automated system to determine the optimal tilt of the tower 112 for optimal wind capture. In some embodiments, information from sensors on the spherical shell 102, the dimples 104, or the tower 112 can be used by a computer automated system to determine the optimal tilt of the pivot 110 for optimal wind capture. In some embodiments, information from at least one database can be used by a computer automated system to determine the optimal configuration of the spherical wind turbine apparatus 100 for optimal wind capture. In some embodiments, a processor can be configured to automatically pivot the spherical shell 102 to the optimal position for capturing wind. In some embodiments, a processor can be configured to automatically orient mirrors configured to reflect light for optimal saturation by the solar panels.

Figure 2C:
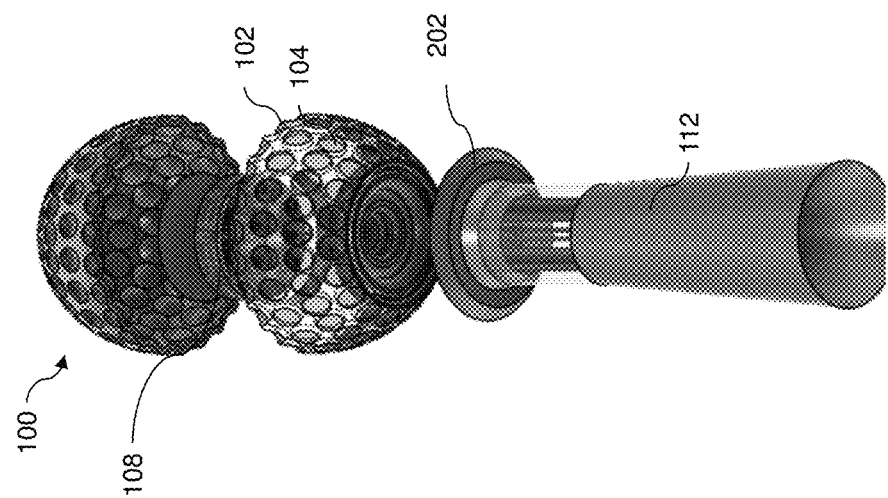
FIG. 2A-C illustrate an embodiment of the spherical wind turbine apparatus with the spherical shell disassembled.
Figure 2B:
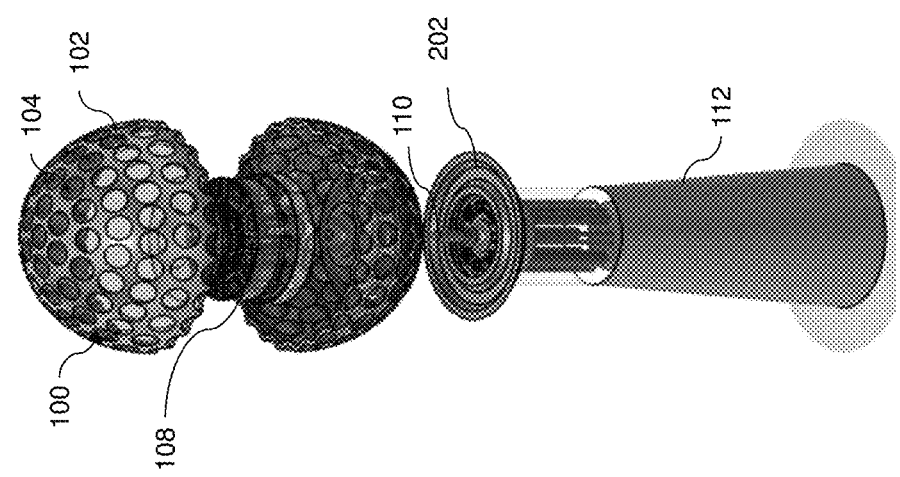
Figure 2A:
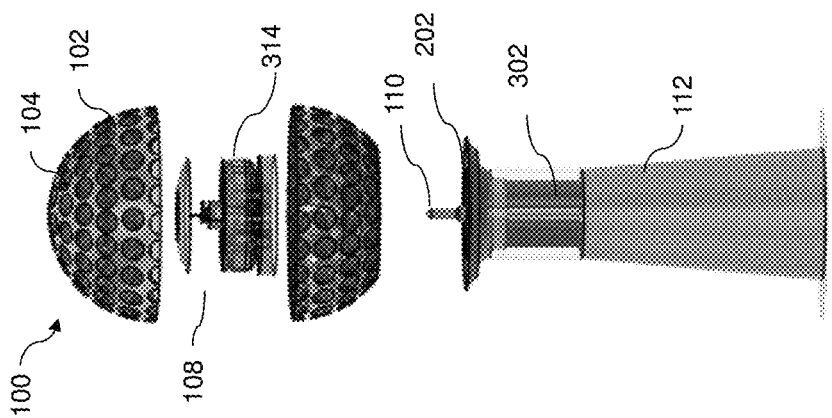

FIG. 2A illustrates a frontal exploded view of an embodiment of the spherical wind turbine apparatus with the spherical shell disassembled. FIG. 2B illustrates a frontal, perspective exploded view of an embodiment of the spherical wind turbine apparatus with the spherical shell disassembled. FIG. 2C illustrates another frontal, perspective exploded view of an embodiment of the spherical wind turbine apparatus with the spherical shell disassembled. In some embodiments, the pivot 110 can be structural support for the spherical shell 102 to rotate about. In some embodiments, the pivot 110 can be in contact with the spherical shell 102 with minimal friction. In some embodiments, the pivot 110 can be electrically configured to a generator, for example generator 108. In same embodiments, the pivot 110 can have at least one hole for at least one wire to pass through it. In some embodiments, the pivot 110 can have a longer height than diameter. In some embodiments, the pivot 110 can have a longer diameter than height. In some embodiments, the pivot 110 can have a flat top. In some embodiments, the pivot 110 can have a rounded top. In some embodiments, the pivot 110 can have a pyramid shape. In some embodiments, the pivot 110 can have a rectangular prism shape. In some embodiments, the pivot 110 can have a spherical shape. In some embodiments, the pivot 110 can be a cylinder. In some embodiments, the pivot 110 can be a wedge. In some embodiments, the pivot 110 cannot rotate more than 360 degrees. In some embodiments, the pivot 110 can rotate more than 360 degrees. In some embodiments, the pivot 110 can allow the spherical shell 102 to rotate in only one direction. In some embodiments, the pivot 110 cannot not rotate. In some embodiments, the pivot 110 can have a locking mechanism such that spherical shell can be easily attached and detached. In some embodiments, the pivot 110 can contain helical screw threads. In some embodiments, the spherical shell 102 can be removably couplable to the pivot via magnets. In some embodiments, the pivot 110 can spin on ball bearings. In some embodiments, the pivot 110 can have multiple prongs couplable to the spherical shell 102. In some embodiments, the pivot 110 can act as a wire to transmit instructions between other components of spherical wind turbine apparatus 100. In some embodiments, the pivot 110 can contain a gyroscope to track angle and rotation.

In some embodiments, the tower 112 can have rings 202 at the top that the spherical shell 102 can sit on. In some embodiments, the rings 202 on the top of the tower 112 can be made of rubber. In some embodiments, the rings 202 on the top of the tower 112 can be made of metal. In some embodiments, the rings 202 on the top of the tower 112 can keep dust away from the moving parts without obstructing movement of the spherical shell 102. In some embodiments, the rings 202 on top of the tower 112 can seal the spherical shell from water. In some embodiments, the rings 202 on the top of the tower 112 can comprise a cone. In some embodiments, the rings 202 on the top of the tower 112 can comprise a movable bottom axis cone. In some embodiments, the rings 202 on top of the tower 112 can contain ball bearings. In some embodiments, the rings 202 on top of tower 112 can have holes for wires. In some embodiments, the rings 202 can be covered in a protective polymer layer. In some embodiments, the rings 202 can contain a gyroscope to track angle and rotation. In some embodiments, a cage 106 inside the spherical shell 102 can be connected to the spherical shell 102 via beams.

Figure 3B:
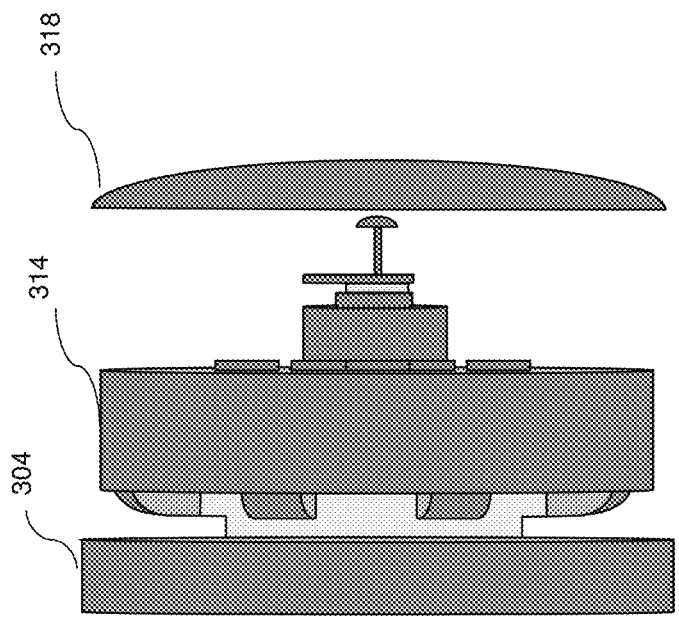
FIG. 3A-D illustrate an embodiment of the generator used to generate energy within the spherical wind turbine.
Figure 3A:
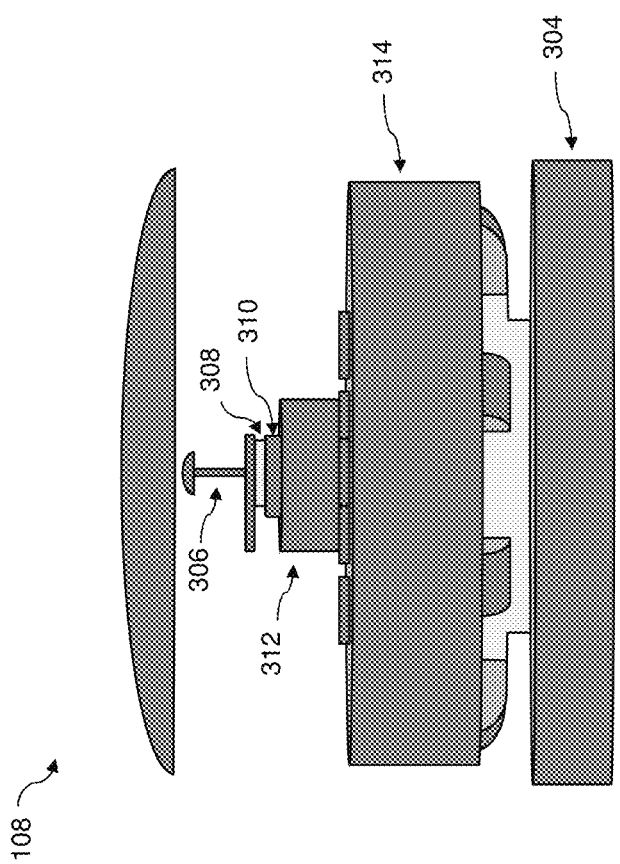
Figure 3C:
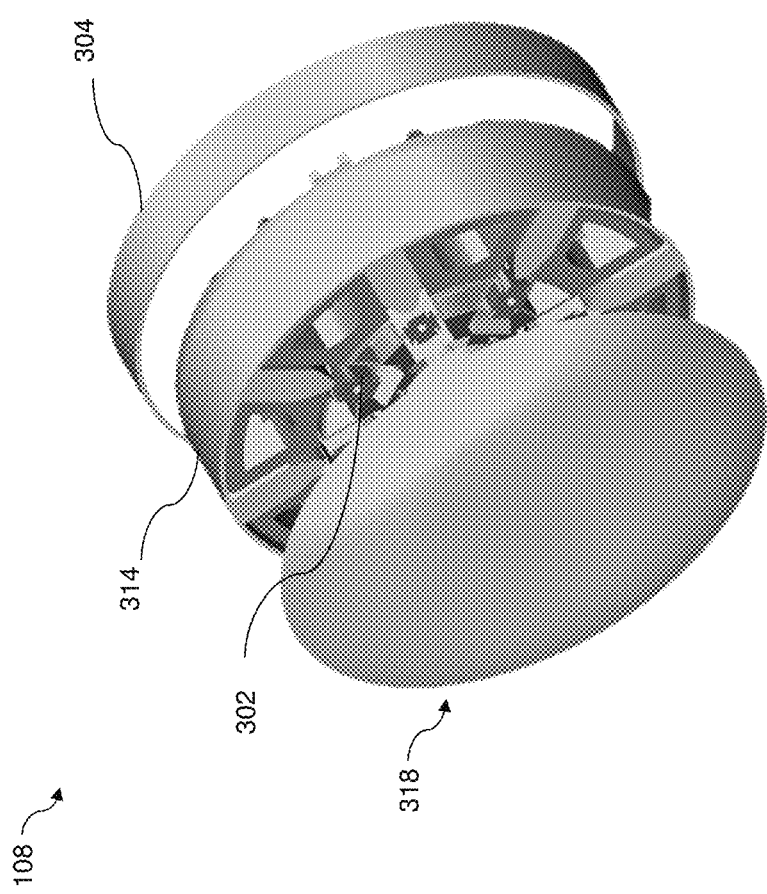
Figure 3D:
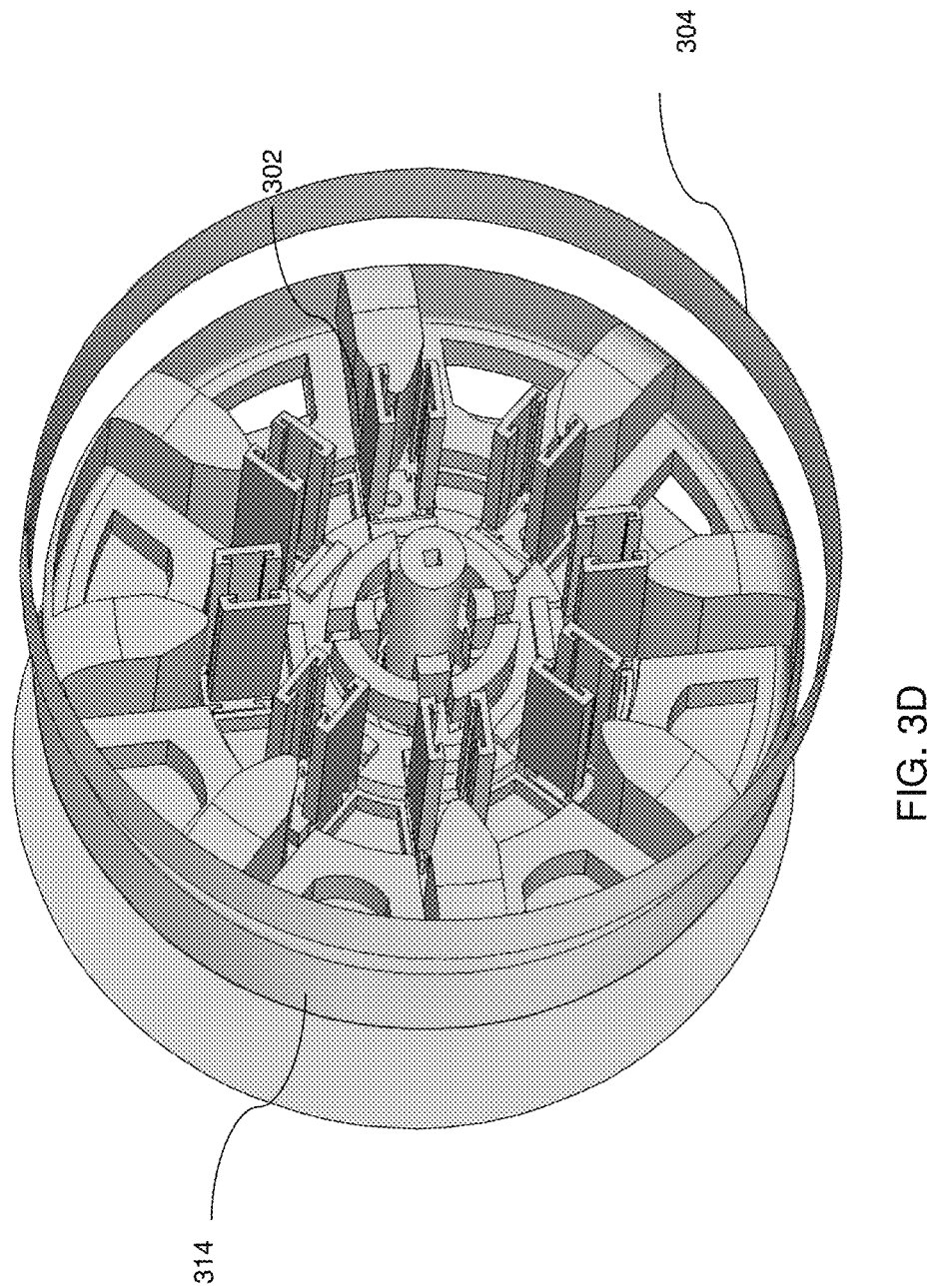

FIG. 3A illustrates an angled side view of an embodiment of the generator 108 used to generate energy within the spherical wind turbine. FIG. 3B illustrates a side view of an embodiment of the generator 108 and housing section 314 used to generate energy within the spherical wind turbine. FIG. 3C illustrates a top perspective view of an embodiment of the generator 108 and housing section 314 used to generate energy within the spherical wind turbine. FIG. 3D illustrates a bottom perspective view of an embodiment of the generator 108 and housing section 314 used to generate energy within the spherical wind turbine. In some embodiments, the rails 302 can carry batteries up and down the tower 112.

In some embodiments, the cage 106 can sit above an O-ring 304. In some embodiments, the cage 106 can sit above a hydraulic O-ring 304. In some embodiments, the generator 108 can have an O-ring 304 at the bottom. In some embodiments, the generator 108 can have a hydraulic O-ring 304 at the bottom. In some embodiments, the generator 108 can comprise a shaft 306, a rotor 308, and a stator 312. The rotor 308 can be mounted on the shaft 306 and supported by bearings to enable rotational movement. In some embodiments an armature 310 can be coupled to the rotor 308. In some embodiments, the armature 310 can be coupled to the stator 312. In some embodiments a commutator can be coupled to the armature 310. In some embodiments, the stator 312 can comprise a set of wire coils wound around a laminated iron core. These wire coils can be arranged to form a three-phase winding system for efficient generation of alternating current (AC) electricity. In some embodiments, the rotor 308 can comprise a set of magnetic poles arranged to induce a rotating magnetic field when the rotor is in motion. The rotational movement can be facilitated by the shaft 306, which can be mechanically coupled to cage 106. In some embodiments, the generator can be covered with cover 318. The cover 318 can have holes or gaps as needed, for example to reduce weight, provide an opening for shaft 306, or to provide an opening for wires. The cover 318 can provide structural support and protection for generator 108.

In some embodiments, the generator 108 can be enclosed in housing section 314. In some embodiments, only parts of the generator 108 can be enclosed in housing section 314, for example the rotor 308 and stator 312. The housing section 314 can provide structural support and protection for the generator 108. The housing section 314 can be configured to house batteries and rails 302. In some embodiments, the housing section 314 can be configured to replace batteries via the rails 302 connecting to the tower 112.

Figure 4:
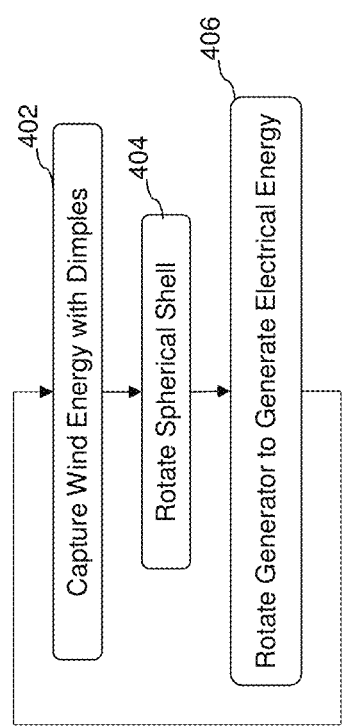
FIG. 4 illustrates an example process for generating electrical energy using the spherical wind turbine.

FIG. 4 illustrates an example process for generating electrical energy using the spherical wind turbine. At block 402, the dimples 104 can capture the wind. In some embodiments, capturing the wind can mean being affected by the wind. In some embodiments, capturing the wind can mean being pushed by the wind. In some embodiments, spherical shell 102 can be tilted or rotated by the pivot 110 to more effectively capture the wind energy. In some embodiments, the spherical shell 102 can be raised or lowered by the tower 112 to more effectively capture the wind energy. In some embodiments, adjustments to the position of the spherical shell 102 can be performed automatically by a processor receiving stored instructions from a data storage device. In some embodiments, adjustments to the position of the spherical shell 102 may be performed automatically by a processor receiving instructions from a wireless receiver.

At block 404, the wind can cause the spherical shell 102 to rotate. In some embodiments, the spherical shell 102 can rotate in response to the wind pushing on the dimples 104. In some embodiments, the spherical shell 102 can engage a locking mechanism if operation is not desired and the spherical shell 102 will not rotate.

At block 406, the rotation of the spherical shell 102 can cause the generator 108 to rotate. In some embodiments, the spherical shell 102 can be connected to the generator 108 such that the generator 108 can spin when the spherical shell 102 rotates. In some embodiments, the generator 108 can create energy when it spins. In some embodiments, the generator 108 can be an AC generator. In some embodiments, the generator 108 can be a DC generator. In some embodiments, the generator 108 can charge batteries when the spherical shell 102 rotates. In some embodiments, the generator 108 can transfer the electricity via wires through the tower 112.

Figure 5:
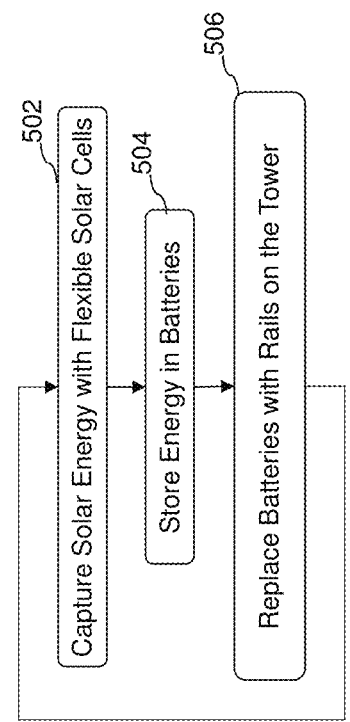
FIG. 5 illustrates an example process for generating energy using the flexible solar panels on the spherical wind turbine.

FIG. 5 illustrates an example process for generating energy using the flexible solar panels on the spherical wind turbine. At block 502, the solar cells can capture solar energy. In some embodiments, the solar energy can be converted to electrical energy. In some embodiments, the solar cells can be adorned on the tower 112. In some embodiments, the solar panels can be on the spherical shell 102. In some embodiments, the solar panels can be on the dimples 104.

At block 504, the electrical energy can be stored in batteries. In some embodiments, the batteries can be the same batteries the generator 108 stores energy in. In some embodiments, the batteries can be lithium-ion batteries. In some embodiments, the batteries can be nickel metal hybrid batteries. In some embodiments, the batteries can be stored in the tower 112.

At block 506, the batteries can be replaced using the rails 302 on the tower 112. In some embodiments, the rails 302 can transport charged batteries down the tower 112. In some embodiments, the rails 302 can transport uncharged batteries up the tower 112. In some embodiments, the rails 302 can transport defective batteries down the tower 112. In some embodiments, the rails 302 can be electrically powered. In some embodiments, the rails 302 can operate via a pulley system. In some embodiments, the generator 108 can operate as a winch for the rails 302. In some embodiments, the rails 302 can rotate the batteries into a desired orientation. In some embodiments, the rails 302 can be autonomously controlled by a processor receiving instructions from a data storage device. In some embodiments, the rails 302 can be controlled by a processor receiving instructions from a wireless receiver.

Figure 6:
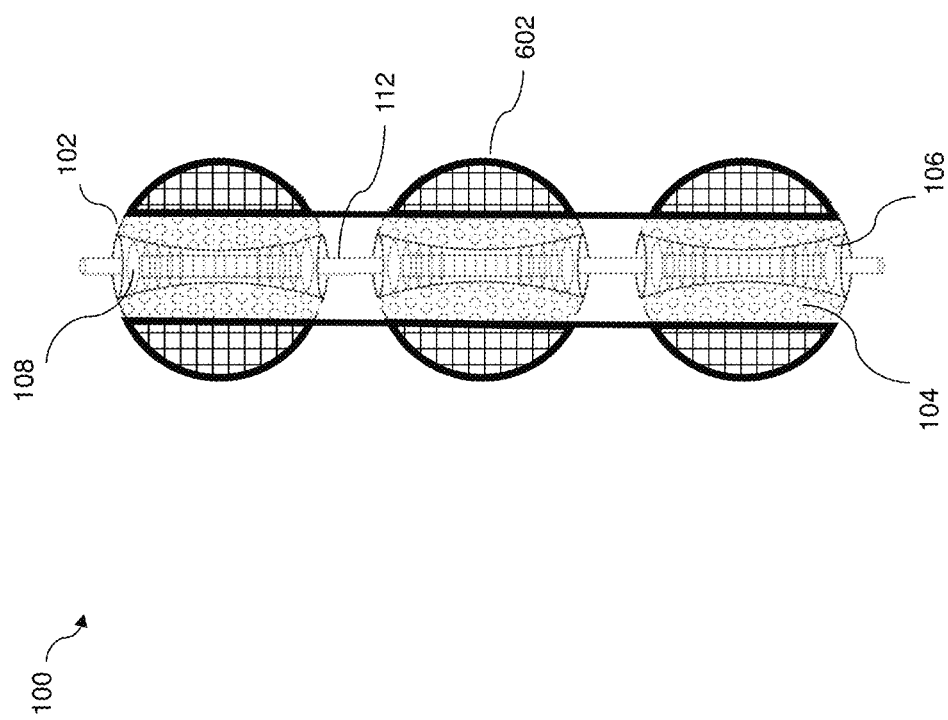
FIG. 6 illustrates an embodiment of the spherical wind turbine apparatus with an array of shells, generators, and air vents.

FIG. 6 illustrates an embodiment of the spherical wind turbine apparatus with an array of shells, generators, and air vents. In some embodiments, the tower 112 can have more than one spherical shell 102. In some embodiments, the spherical shells 102 can be stacked vertically. In some embodiments, the spherical shells 102 can be stacked horizontally. In some embodiments, the spherical shells 102 can be positioned in an array. In some embodiments, the spherical shells 102 can be stacked in a group of 3 shells. In some embodiments, the spherical shells 102 can be stacked in a group of 2-4 shells. In some embodiments, the spherical shells 102 can be stacked in a group of 2-10 shells. In some embodiments, multiple of the spherical shells 102 can be stacked on multiple towers. In some embodiments, the multiple spherical shells 102 can rotate independently from each other. In some embodiments, the multiple spherical shells 102 can tilt independently by the pivot 110. In some embodiments, the multiple spherical shells 102 can be magnetically couplable to each other. In some embodiments, the multiple spherical shells 102 can charge the same batteries. In some embodiments, wires from the generator 108 can feed from a top spherical shell through the center of at least one lower spherical shell to charge a battery.

In some embodiments, airflow vents 602 can be placed on top of the spherical shells 102. In some embodiments, the airflow vents 602 can be used to direct airflow. In some embodiments, the airflow vents 602 can be used to focus airflow. In some embodiments, the airflow vents 602 can serve as a locking mechanism for the spherical shells 102 to be coupled to. In some embodiments, the airflow vents 602 can be opened or closed. In some embodiments, the direction of the opening of the airflow vents 602 can be controlled by the processor. In some embodiments, the angle of the airflow vents 602 can be controlled by the processor. In some embodiments, the airflow vents 602 can be magnetically couplable to the spherical shells 102. In some embodiments, the airflow vents 602 can be used to protect spherical shells from damage from external sources.

In some embodiments, the airflow vents 602 can be covered, at least partially, with one or more solar cells. In some embodiments, the size, spacing, and placement of the solar cells can be adjusted to more efficiently capture energy from light depending on the intended environment of the apparatus. In some embodiments, the airflow vents 602 can have holes for wires to transmit electricity from the solar cells through the airflow vents 602 to a battery. In some embodiments, the electricity from the solar cells on the airflow vents 602 can charge the same batteries that the generator 108 charges. In some embodiments, the airflow vents 602 can have a hinged section to allow access the tower 112 when desired, for example for battery collection. In some embodiments, the airflow vents 602 can have a hinged section to allow access to the generator 108, for example for maintenance.

Embodiments

Embodiment 1. An apparatus for creating electrical energy from wind, the apparatus comprising: a spherical turbine with at least one dimple; a cage inside the spherical turbine, wherein the cage is connected to the spherical turbine with at least one beam; a generator mounted inside the cage, wherein the generator is configured to generate energy when the cage rotates; a pivot attached to a bottom of the spherical turbine; and a tower attached to the bottom of the pivot, wherein the tower is configured to support the spherical turbine.

Embodiment 2. The apparatus of Embodiment 1, wherein the at least one dimple is round.

Embodiment 3. The apparatus of Embodiment 1, wherein the at least one dimple is hexagonal.

Embodiment 4. The apparatus of Embodiment 1, wherein the at least one dimple is a notch.

Embodiment 5. The apparatus of Embodiment 1, wherein the at least one dimple is an indentation.

Embodiment 6. The apparatus of Embodiment 1, wherein the at least one dimple is a dent.

Embodiment 7. The apparatus of Embodiment 1, wherein the pivot is made of rubber.

Embodiment 8. The apparatus of Embodiment 1, wherein the pivot is made of a light-weight metal.

Embodiment 9. The apparatus of Embodiment 1, wherein the pivot is positioned manually.

Embodiment 10. The apparatus of Embodiment 1, wherein the pivot is positioned automatically.

Embodiment 11. The apparatus of Embodiment 1, wherein the generator comprises a rotor and a stator.

Embodiment 12. The apparatus of Embodiment 1, wherein the generator is driven by a gearbox.

Embodiment 13. The apparatus of Embodiment 1, wherein the generator contains a liquid cooling system.

Embodiment 14. The apparatus of Embodiment 1, wherein the generator is synchronous.

Embodiment 15. The apparatus of Embodiment 1, wherein the generator is asynchronous.

Embodiment 16. The apparatus of Embodiment 1, wherein the generator is a hydraulic generator.

Embodiment 17. The apparatus of Embodiment 1, wherein the generator is not stationary when the spherical turbine is spinning.

Embodiment 18. The apparatus of Embodiment 1, wherein the generator is stationary when the spherical turbine is spinning.

Embodiment 19. The apparatus of Embodiment 1, wherein the tower is configured to lean.

Embodiment 20. The apparatus of Embodiment 1, wherein the tower is configured to sway with the wind.

Embodiment 21. The apparatus of Embodiment 1, wherein the tower is made from a light-weight metal.

Embodiment 22. The apparatus of Embodiment 1, wherein the tower is made from steel.

Embodiment 23. The apparatus of Embodiment 1, wherein the tower is made from fiberglass.

Embodiment 24. The apparatus of Embodiment 1, wherein the tower is made from resin.

Embodiment 25. The apparatus of Embodiment 1, wherein the tower is made from plastic.

Embodiment 26. The apparatus of Embodiment 1, wherein the tower is made from iron.

Embodiment 27. The apparatus of Embodiment 1, wherein the tower is made from copper.

Embodiment 28. The apparatus of Embodiment 1, further comprising: at least one solar cell overlayed on an exterior of the spherical turbine; at least one hole in the cage; a battery inside the cage; and at least one wire connecting the at least one solar cell to the battery through the at least one hole in the cage.

Embodiment 29. The apparatus of Embodiment 28, wherein the at least one solar cell is overlayed on the at least one dimple.

Embodiment 30. The apparatus of Embodiment 28, further comprising a rail on the tower, wherein the rail is configured to move the battery up and down the tower.

Embodiment 31. The apparatus of Embodiment 1, wherein the cage is a cone.

Embodiment 32. The apparatus of Embodiment 1, wherein the cage is a cylinder.

Embodiment 33. The apparatus of Embodiment 1, wherein the cage is a cone.

Embodiment 34. The apparatus of Embodiment 1, wherein the cage is hollow.

Embodiment 35. The apparatus of Embodiment 1, further comprising an O-Ring attached to the cage.

Embodiment 36. The apparatus of Embodiment 1, further comprising a hydraulic O-Ring configured to the cage.

Embodiment 37. The apparatus of Embodiment 1, further comprising a rubber ring on top of the tower.

Embodiment 38. The apparatus of Embodiment 1, further comprising a metal ring on top of the tower.

Embodiment 39. The apparatus of Embodiment 37, wherein kinetic energy from rotation of an O-Ring is stored in the battery.

Embodiment 40. The apparatus of Embodiment 38, wherein kinetic energy from rotation of an O-Ring is stored in the battery.

Embodiment 41. The apparatus of Embodiment 1, wherein the at least one beam is hydraulic.

Embodiment 42. The apparatus of Embodiment 28, further comprising at least one smart switch configured to turn the at least one solar cell on and off.

Embodiment 43. The apparatus of Embodiment 1, further comprising at least one lip on the at least one dimple.

Embodiment 44. The apparatus of Embodiment 28, further comprising at least one smart switch configured to turn the at least one solar cell on or off.

Embodiment 45. The apparatus of Embodiment 1, wherein the pivot is configured to tilt the spherical turbine to an angle in which the at least one dimple can capture wind.

Embodiment 46. The apparatus of Embodiment 1, further comprising a converter connected to the generator, wherein the converter is configured to convert voltage from alternating current to direct current.

Embodiment 47. A method for harvesting energy from wind flow, the method comprising: exposing a spherical turbine to wind flow, wherein the spherical turbine comprises: at least one dimple, a pivot that is pivotable perpendicular to a tower, a cage comprising a generator, wherein the spherical turbine is pivoted such that at least one of the dimples is configured to catch the wind flow causing the spherical turbine to rotate, allowing the generator to convert rotational energy to electrical energy.

Implementation Details

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will also be understood that, when a feature or element (for example, a structural feature or element) is referred to as being "connected", "attached" or "coupled" to another feature or element, it may be directly connected, attached, or coupled to the other feature or element or intervening features or elements may be present. In contrast, when a feature or element is referred to as being "directly connected," "directly attached" or "directly coupled" to another feature or element, there may be no intervening features or elements present. Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a," "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/."

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly," "downwardly," "vertical," "horizontal" and the like may be used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing numeric values of magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

What is claimed is:

1. An apparatus for creating electrical energy from wind, the apparatus comprising:
   a spherical turbine comprising at least one dimple, the at least one dimple configured to capture wind to rotate the spherical turbine;
   a cage inside the spherical turbine, wherein the cage is coupled to the spherical turbine with at least one beam, and wherein the cage is configured to rotate when the spherical turbine rotates;
   a generator inside the cage, wherein the generator is configured to generate energy when the cage rotates;
   a tower configured to support the spherical turbine; and
   a pivot coupling the tower to the spherical turbine.

2. The apparatus of claim 1, wherein at least one solar cell is overlayed on the at least one dimple.

3. The apparatus of claim 1, further comprising a rail in the tower.

4. The apparatus of claim 1, further comprising an O-Ring inside the spherical turbine.

5. The apparatus of claim 4, wherein kinetic energy from rotation of the O-Ring is stored in a battery.

6. The apparatus of claim 1, further comprising a hydraulic O-Ring inside the spherical turbine.

7. The apparatus of claim 1, further comprising a rubber ring on the tower.

8. The apparatus of claim 1, further comprising a metal ring on the tower.

9. The apparatus of claim 1, wherein the at least one beam is hydraulic.

10. The apparatus of claim 1, wherein the pivot is configured to tilt the spherical turbine to an angle in which the at least one dimple can capture wind.

* * * * *